Feb. 2, 1926.

O. KARCHER

VELOCIPEDE

Filed Oct. 25, 1924

1,571,202

Inventor
Otto Karcher
By Frease and Bond
Attorneys

Patented Feb. 2, 1926.

1,571,202

UNITED STATES PATENT OFFICE.

OTTO KARCHER, OF CANTON, OHIO.

VELOCIPEDE.

Application filed October 25, 1924. Serial No. 745,802.

To all whom it may concern:

Be it known that I, OTTO KARCHER, a citizen of the United States, residing at Canton, in the county of Stark and State of Ohio, have invented certain new and useful Improvements in Velocipedes, of which the following is a specification.

This invention relates to self propelled toy vehicles of the velocipede or tricycle type, and the object of the invention is to provide a vehicle of this type which is propelled by means of a crank shaft to which motion is imparted by a rocking lever having a seat at one end and foot rests at the other end, and which is connected to a hand lever forming the steering bar, whereby the vehicle may be propelled by the movement of the body, legs, and arms of the occupant; a further object being the provision of a peculiar crank shaft which will never reach a dead center and which will always be in position to propel the vehicle when the occupant places his weight upon the seat and foot rests.

The above and other objects may be attained by constructing the vehicle in the manner illustrated in the accompanying drawing, in which—

Figure 1:
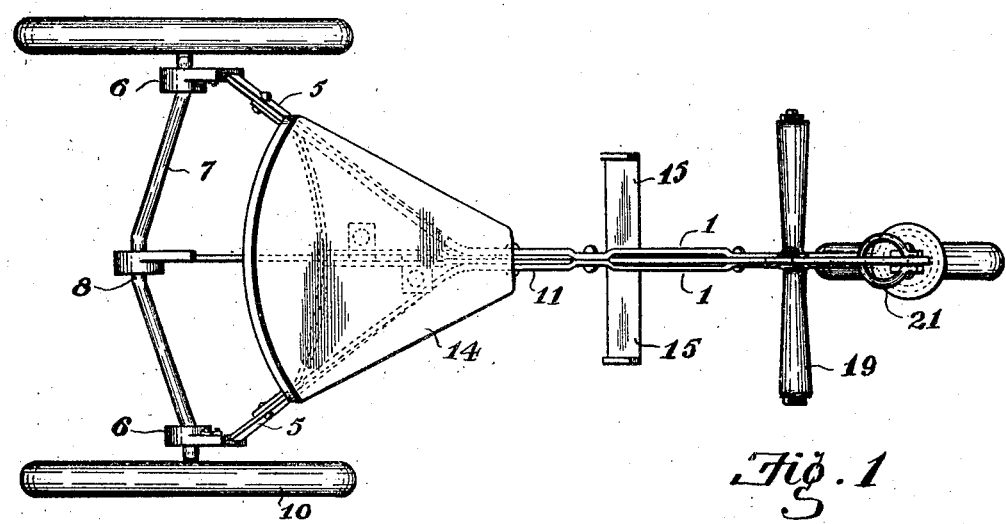

Figure 1 is a plan view of a toy vehicle embodying the invention; and

Figure 2:
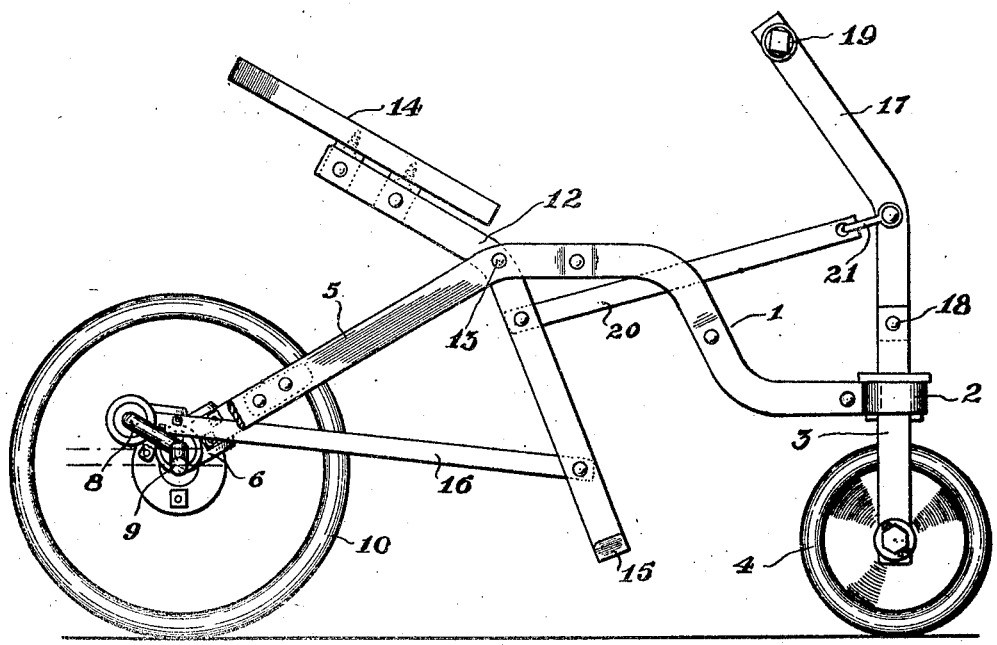

Fig. 2, a side elevation of the same, a portion of the frame being broken away and one rear wheel removed for the purpose of illustration.

Similar numerals refer to similar parts throughout the drawing.

The frame of the vehicle is preferably formed of two bars of metal indicated at 1, the forward ends of which are connected together and bent downward and forward, carrying a bearing 2 at the front extremity, within which is journaled a fork 3 carrying the front wheel 4.

The rear end portions of the rods are inclined downward and outward from each other as shown at 5, terminating in bearings 6 in which the crank shaft 7 is journaled.

The central portion of the crank shaft is off-set as at 8 and each end portion thereof, beyond the bearings 6, is off-set as at 9 at substantially the angle to the off-set portion 8, illustrated in Fig. 2. The rear wheels 10 are fixed upon the off-set portions of the crank shaft in any usual manner.

The frame bars 1 are slightly separated, as indicated at 11, to receive the bent rocking lever 12, which is pivoted upon the frame, as shown at 13.

A seat 14 is fixed upon the rear end of the lever and foot rests 15 are provided upon the forward end thereof. A link 16 pivotally connects the off-set portion 8 of the crank shaft with the lever 12.

The steering rod 17 may be pivotally connected at its lower end, as shown at 18, to the fork 3, and provided with the handle bars 19. To increase the power, this steering rod may be connected by a link 20 with the lever 12, in order that the occupant may assist with his hands and arms in propelling the vehicle by rocking the rod 17.

In order to permit the steering rod to be turned to steer the front wheel, a ring 21 is carried by the rod 17 and loosely connected to the forward end of the link 20. Thus, when the rod 17 is moved to a vertical position, it may be freely turned in either direction without interference by the connection to the link 20.

It will be seen from the above that owing to the peculiar shape of the crank shaft, the same will never attain a dead center, as regardless of the position of the crank shaft, the moment the weight of the occupant is placed upon the vehicle, the crank shaft will be rotated to propel the vehicle.

The parts will normally assume substantially the position shown in Fig. 2 when the rider leaves the same. Assuming the parts to be in this position, it will be seen that the moment the weight of the body is placed upon the seat 14, the lever 12 will be rocked to the other extreme of its movement, at which time the rider, by shifting his weight from the seat to the foot rests, continues the motion of the vehicle which may be assisted by rocking the steering lever 17.

It will thus be obvious that regardless of the position in which the parts are located, the weight of the rider upon the vehicle will bring the crank shaft into position for propelling the vehicle by the shifting of the weight of the body, as above described.

I claim:—

1. A vehicle comprising a frame, a fork journaled in the frame and carrying a wheel, a crank shaft journaled in the frame, an off-set portion at each end of the crank shaft, a wheel fixed to each off-set portion, a lever pivoted intermediate its ends to the frame, a seat upon the rear end of the lever, foot rests upon the forward end of the lever and a link connecting the crank shaft and lever.

2. A vehicle comprising a frame, a fork journaled in the frame and carrying a wheel, a crank shaft journaled in the frame, an off-set portion at each end of the crank shaft, a wheel fixed to each off-set end of the crank shaft, a lever pivoted intermediate its ends to the frame, a seat upon the rear end of the lever, foot rests upon the forward end of the lever and a link connecting the crank shaft and the forward end portion of the lever.

3. A vehicle comprising a frame, a fork journaled in the frame and carrying a wheel, a crank shaft journaled in the frame and having an off-set central portion and an off-set portion at each end disposed at an angle to the central portion, a wheel fixed to each off-set end portion of the crank shaft, a lever pivoted intermediate its ends to the frame, a seat upon the rear end of the lever, foot rests upon the forward end of the lever and a link connecting the crank shaft and lever.

4. A vehicle comprising a frame, a fork journaled in the frame and carrying a wheel, a crank shaft journaled in the frame, a wheel fixed to each end of the crank shaft, a lever pivoted intermediate its ends to the frame, a seat upon the rear end of the lever, foot rests upon the forward end of the lever, a link connecting the crank shaft and lever, a steering bar pivotally connected to the fork, and a link connecting the steering bar and lever.

5. A vehicle comprising a frame, a fork journaled in the frame and carrying a wheel, a crank shaft journaled in the frame, a wheel fixed to each end of the crank shaft, a lever pivoted intermediate its ends to the frame, a seat upon the rear end of the lever, foot rests upon the forward end of the lever, a link connecting the crank shaft and lever, a steering bar pivotally connected to the fork, a ring connected to said steering bar, and a link pivotally connected to the lever and slidably connected to said ring.

6. A toy vehicle of the class described comprising a frame, said frame including a pair of spaced beams, a crank shaft supported below the rear ends of the beams, driving wheels on the respective ends of the crank shaft, a steering wheel at the forward end of the frame, an elongated lever having its end portions off-set with respect to each other, means for pivotally supporting the intermediate portions of the lever between said spaced beams at a point intermediate the ends of the frame, the forward end portion of the lever being disposed below the frame, a foot engaging member carried by the forward end of the lever, a seat on the rear end portion of said lever, and means connecting the lever with the crank shaft whereby the oscillatory movement of the lever will be converted into a rotary movement of the crank shaft and the driving wheels, said means comprising a pitman connected at one end to the lever extending rearwardly between the spaced beams of the frame, the other end of the pitman being secured to the crank portion of said crank shaft.

In testimony that I claim the above, I have hereunto subscribed my name.

OTTO KARCHER.